Nov. 14, 1939.　　　　W. E. PATRICK　　　　2,179,516
ROPE CLAMP
Filed Oct. 14, 1938
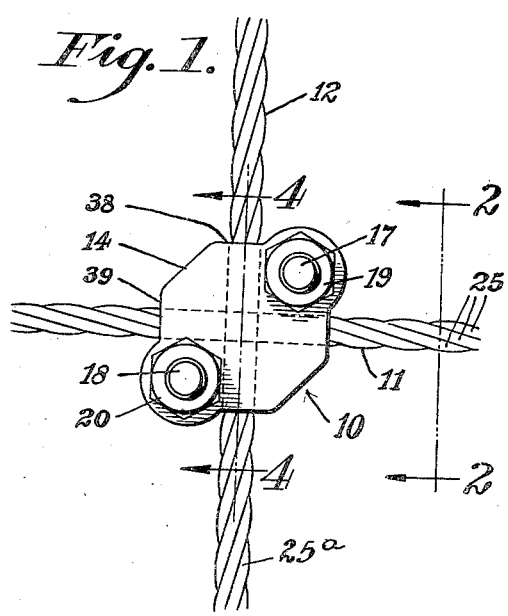
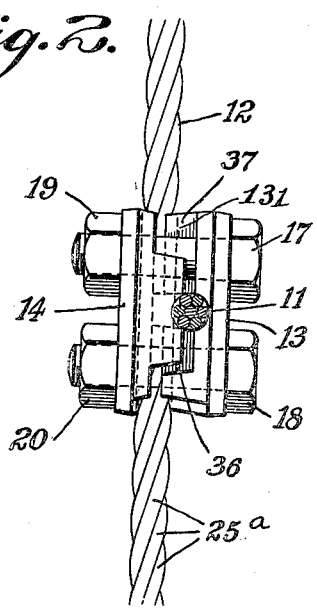
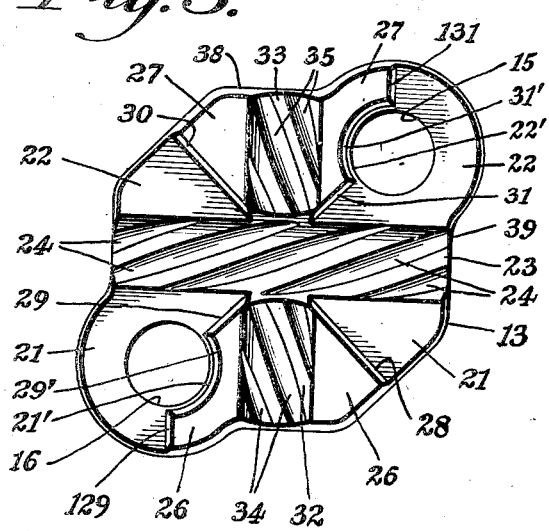
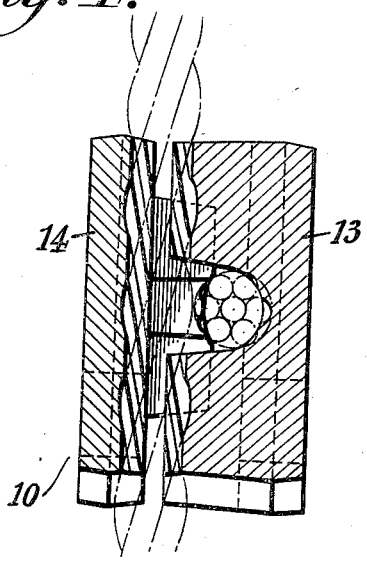
INVENTOR
Wm. E Patrick
BY
ATTORNEY Patented Nov. 14, 1939

2,179,516

UNITED STATES PATENT OFFICE 2,179,516

ROPE CLAMP

William E. Patrick, Silver Spring, Md.

Application October 14, 1938, Serial No. 234,929

2 Claims. (Cl. 24—125)

(Granted under the act of March 3, 1883, as amended April 30, 1928; 370 O. G. 757)

This invention relates to a rope clamp, and has for an object to provide a clamp made of two clamping members substantially alike, adapted to be held together by two fastening members passing through the two opposite ends thereof for holding two ropes crossing each other, preferably at right angles but in different planes, and furthermore, to provide two clamping members adapted to be brought into proper cooperative relation to each other through the medium of the ropes to be clamped therebetween.

A further object of this invention is to provide a rope clamp similar in general nature to but having improved constructural and functional features over the clamps disclosed in U. S. Patents 1,540,398; 1,396,115, and in British Patents 2,339, October 21, 1914, and 1,678, February 2, 1915.

With the foregoing and other objects in view, the invention consists in the construction, combination and arrangement of parts hereinafter described and illustrated in the drawing, in which, Fig. 1 is a top plan view of the assembled rope clamp of this invention in operative position.

Fig. 2 is a view on line 2—2 of Fig. 1.

Fig. 3 is a top plan view of the clamping surface of one clamping member; and,

Fig. 4 is a sectional view on line 4—4 of Fig. 1.

There is shown at 10 the clamp of this invention which is used for clamping two substantially identical ropes, 11 and 12, together in parallel but different planes, the ropes 11 and 12 extending preferably, but not necessarily, at right angles to each other. The clamp 10 consists of two substantially identical clamping plates 13 and 14, each provided with bolt holes 15 and 16 at opposite ends thereof through which may be passed bolts 17 and 18 to fasten the clamping plates 13 and 14 together by means of the nuts 19 and 20.

Each clamping plate has a pair of substantially flat surfaces 21 and 22 in the same plane divided by a countersunk groove 23, the groove 23 being provided with corrugations 24 into which may fit the strands 25 of the rope 11. Extending up from each of the flat surfaces 21 and 22 are bosses or projections 26 and 27, the boss 26 being connected to the surface 21 by angular side walls 28 and 29, the side wall 29 being spaced from the edge of the hole 16 by the surface 21', as at 29'. In the same way the boss or projection 27 is provided with angular side walls 30 and 31 and a portion 31' separated from the hole 15 by the surface 22'. Each projection 26 and 27 is divided in two by grooves 32 and 33, the grooves 32 and 33 forming, in effect, a single groove, except where it is divided by the intersecting groove 23. The grooves 32 and 33 are each provided with corrugations 34 and 35 adapted to receive therein the strands 25a of the rope 12.

In operation, in order to fasten stranded ropes 11 and 12, which may be either wire, hemp, or other suitable material, one rope, as 11, is laid into the groove 23 with the strands 25 entering into the corrugations 24. The other, as 12, is laid at right angles to the rope 11 into the grooves 32 and 33, with its strands entering into the corrugations 34 and 35. The other clamping plate 14 is laid over the assembled ropes and clamping plate 13, with the bosses or projections of the plate approaching the flat surfaces of the plate 13, and vice versa the bosses or projections of the plate 13 approaching the flat surface of the plate 14.

As will be observed, the angular walls 29 and 31 are on opposite sides of, parallel to, and spaced from a line joining the centers of the bolt holes, while the angular walls 28 and 30 are likewise on opposite sides of, parallel to, and spaced from a line at right angles to and equally dividing the aforesaid bolt holes centers line. Accordingly, angular walls 28 and 30 of the projections of one clamping plate will be spaced from the corresponding angular walls of the other clamping plate a slight distance, as shown at 36 in Fig. 2, angle walls 31 and 29 being spaced a similar distance apart. As a result of this spacing when the clamping plates are put together they need not be perfectly aligned, but they will align themselves in proper relation to each other through cooperation of the grooves and the rope members passing therethrough. The outer edges of the angle walls 29 and 31, as at 131 and 129, may be spaced apart a substantial distance, as shown at 37 in Fig. 2, thereby reducing the weight of the entire clamp. While such reduction in weight may not amount to very much in the case of an individual clamping plate, the saving in total weight amounts to many pounds when thousands of clamping plates are used, as in making up a fence. In order to increase the gripping effect of the clamping plates on the ropes the edge of each clamping plate is made normal to the edge of each groove, as shown at 38 and 39, these edges 38 and 39 thus being at an angle of 45 degrees to a line joining the centers of the bolt holes.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A rope clamp for securing ropes together comprising a pair of substantially identical clamping plates, each plate having a pair of bolt-receiving apertures at opposite ends thereof, having a groove extending through said plate at an angle of 45 degrees to a line connecting the bolt holes, and having a second groove in said plate at right angles to said first groove, bosses projecting above said plate, said second groove being located in said projecting bosses, said second groove being in a plane substantially above the plane of said first groove, angular walls on said bosses connecting said bosses to the surface of said plate, said angular walls on one side of said bosses being spaced from a line joining the centers of the bolt holes, said angular walls on the other side of said bosses being similarly spaced from the line at right angles to and equally dividing said bolt hole center line, the edges of said plate at the ends of each groove being normal to the direction of said groove, whereby when said plates are clamped together by bolts and nuts through the bolt holes to fasten a pair of rope members together at right angles to each other, the rope members will be held in different planes and the clamping plates will be brought into proper alignment by cooperation of the angular walls and rope members, the normal edges of the plates at the grooves providing maximum rope clamping portions.

2. A rope clamp for securing ropes together comprising a pair of substantially identical clamping plates, each plate having a pair of fastening member receiving apertures at opposite ends thereof, having a groove extending through said plate at an angle of 45 degrees to a line connecting the fastening member holes, and having a second groove in said plate at right angles to said first groove, bosses projecting above said plate, said second groove being located in said projecting bosses, said second groove being in a plane substantially above the plane of said first groove, angular walls on said bosses connecting said bosses to the surface of said plate, said angular walls on one side of said bosses being spaced from a line joining the centers of the fastening member holes, said angular walls on the other side of said bosses being similarly spaced from the line at right angles to and equally dividing said fastening member hole center line, the edges of said plate at the ends of each groove being normal to the direction of said groove, whereby when said plates are clamped together by fastening members through the fastening member holes to fasten a pair of rope members together at right angles to each other, the rope members will be held in different planes and the clamping plates will be brought into proper alignment by cooperation of the angular walls and rope members, the normal edges of the plates at the grooves providing maximum rope clamping portions.

WILLIAM E. PATRICK.